United States Patent [19]

Poirier

[11] 4,318,102
[45] Mar. 2, 1982

[54] INTRUSION DETECTION SYSTEM HAVING LOOK-UP SENSOR INSTRUMENTATION FOR INTRUSION RANGE AND ALTITUDE MEASUREMENTS

[75] Inventor: Joseph L. Poirier, Chelmsford, Mass.

[73] Assignee: The United States of America as represented by the Secretary of the Air Force, Washington, D.C.

[21] Appl. No.: 140,551

[22] Filed: Apr. 15, 1980

[51] Int. Cl.³ .............................................. G01S 13/08
[52] U.S. Cl. ................................... 343/12 A; 340/552; 343/5 PD
[58] Field of Search .......................... 343/5 PD, 12 A; 340/552

[56] References Cited

U.S. PATENT DOCUMENTS

| | | | |
|---|---|---|---|
| 4,079,361 | 3/1978 | Woode | 343/5 PD X |
| 4,135,185 | 1/1979 | Rotman et al. | 343/5 PD X |
| 4,187,501 | 2/1980 | Olesch et al. | 343/5 PD X |

Primary Examiner—T. H. Tubbesing
Attorney, Agent, or Firm—Donald J. Singer; Willard R. Matthews

[57] ABSTRACT

Range and elevation measurement ambiguities in upward looking intruder detection systems are eliminated by look-up sensor instrumentation that utilizes monostatic and bistatic radar principles. Intruder detection systems that have the capability of monitoring the air space over the perimeter of an area to be protected and that employ radar ranging techniques and guided wave sensor generate only limited or ambiguous intrusion event information. That is, the r.f. signals that are transmitted and received travel from the transmitter-receiver-processor location through the sensor, up to the intrusion and back through the same path. The data developed is thus the same for high altitude close range intrusions as it is for low altitude distant intrusions. This ambiguity is eliminated by utilizing a transmitter and receiver at one end of the upward looking sensor and a second receiver at the other end. The transmitter and its associated receiver comprises a monostatic radar and the transmitter and the other receiver comprises a bistatic radar. The conventional monostatic radar measures total distance from the transmitter to an intrusion. The bistatic radar measures intrusion altitude only. The two radar outputs are differenced by a processor to determine range.

5 Claims, 5 Drawing Figures

INTRUSION DETECTION SYSTEM HAVING LOOK-UP SENSOR INSTRUMENTATION FOR INTRUSION RANGE AND ALTITUDE MEASUREMENTS

STATEMENT OF GOVERNMENT INTEREST

The invention described herein may be manufactured and used by or for the Government for governmental purposes without the payment of any royalty thereon.

BACKGROUND OF THE INVENTION

This invention relates to systems for the protection of secure areas and to intruder detection systems. Specifically, it relates to radar ranging type systems that are adapted to surveillance of the air space over the perimeter of the secure area and that include instrumentation for unambiguous range and altitude measurements.

It is often necessary to protect equipment and secure areas from unauthorized, unwanted and sometimes hostile personnel and vehicles. Such protection conventionally includes fencing that encompasses the area or equipment to be protected. Intruder detection systems are also used in conjunction with fences or other physical deterrent barriers to enable responsible personnel to monitor the premises and to take appropriate action in response to detected intrusions. One well known state-of-the-art intrusion detection system utilizes radar ranging principles. This type of system is implemented by means of leaky transmission lines that encompass the secure area. Violation by an intruder of the r.f. field that radiates from the leaky transmission line results in reflections which can be processed in a known manner to identify and locate any given intrusion event. Surveillance of the air space over the perimeter of the secure area is also accomplished by using an upward looking sensor in conjunction with a leaky transmission line. This directs the distributed r.f. energy transmitted through the leaky transmission line upward, thus providing an electronic "fence" any violation of which results in reflections that are detected and processed by system processing circuits for the activation of alarms and displays. Although systems utilizing these principles expand the surveillance to include the air space over the secure area the state-of-the-art timing techniques used with such systems are inadequate to provide exact intruder location information. That is, only total distance from system transmitter/receiver location to the intrusion is measured providing the knowledge that an intrusion event has occurred while giving no information as to exactly where it has occurred. Therefore an ambiguity exists as to whether the intrusion has occurred at a close high altitude location or at a remote low altitude location or at some intermediate location.

There currently exists the need therefore for instrumentation that will eliminate the location ambiguities that surveillance systems of the type described are subject to. The present invention is directed toward satisfying that need.

SUMMARY OF THE INVENTION

The invention is directed to an r.f. perimeter intrusion detection system for measuring both range and altitude of intrusions that transgress the air space over a protected area. The instrumentation comprehended comprises an r.f. transmitter and a first receiver which forms a monostatic radar and the transmitter and a second receiver which forms a bistatic radar. A look-up intruder sensor comprised of an upward looking guided wave structure fed from an r.f. signal source extending along the secured area perimeter is utilized as the transmitting and receiving antenna for both monostatic and bistatic radars. In closed perimeter systems both receivers are physically located in the same facility and feed processing equipment. The processing equipment derives intruder event elevation information from the bistatic radar returns. The processing equipment also derives intruder event range information by differencing bistatic radar and monostatic radar returns. Applications that utilize a physically remote bistatic radar receiver can utilize r.f. filtering and the sensor cable to bring bistatic receiver data to the system processor. Alternatively an auxilliary interconnecting coaxial cable may be used that supplies power to the system, a reference signal to the second remote receiver and a return path for the output of the second receiver to the processor. In such an embodiment filters are used to combine and separate the signals from the two radars for the processor which derives range and amplitude values for display in the manner described above.

It is a principal object of the invention to provide a new and improved intrusion detection system.

It is another object of the invention to provide an intrusion detection system that is capable of monitoring the air space above the perimeter of an area to be protected.

It is another object of the invention to provide an intrusion detection system having look-up sensor instrumentation for intrusion range and altitude measurements.

It is another object of the invention to provide an intrusion detection system having look-up sensor instrumentation for intrusion range and altitude measurement that is not subject to range and altitude value ambiguities.

It is another object of the invention to provide an intrusion detection system for monitoring the air space above the perimeter of an area to be protected that utilizes the combination of a monostatic and a bistatic radar to eliminate range and altitude value ambiguities.

These together with other objects features and advantages of the invention will become more readily apparent from the following detailed description when taken in conjunction with the illustrative embodiments of the accompanying drawings wherein like elements are given like reference numerals throughout.

DETAILED DESCRIPTION OF THE PREFERRED EMBODIMENT

Most state-of-the-art r.f. perimeter intrusion detection systems do not have an ability to look-up and thus, their zone of detection is limited to intrusions no greater than a few feet from the ground. In these systems, the location of the intrusion is determined by conventional pulse guided wave radar timing techniques. For example, the range R to the point of intrusion is equal to $$R = v t_R / 2 \tag{1}$$

where $t_R$ is the time between transmission of the pulse and reception of its echo from the target, and the propagation velocity along the sensor is v.

Figure 1:
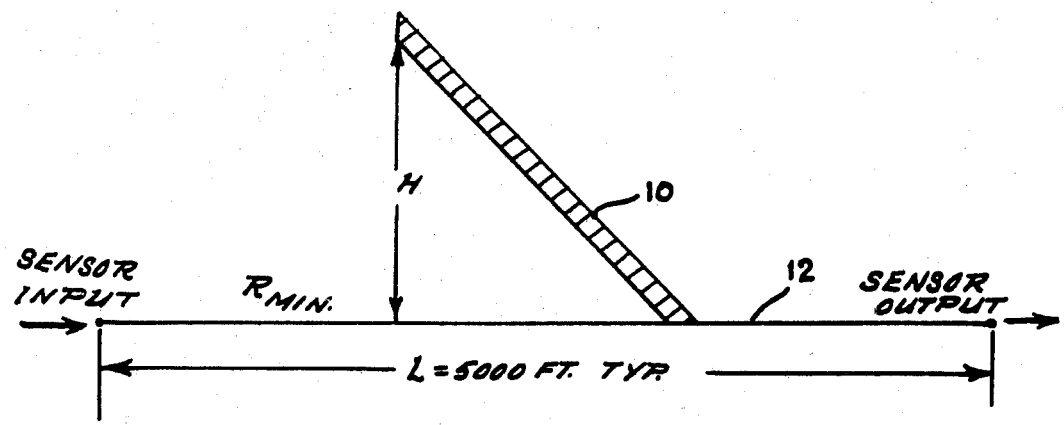
FIG. 1 is a sketch illustrating the uncertainty in target (intrusion event) location encountered when conventional instrumentation is utilized.

New sensor structures which have r.f. detection fields existing for considerable distances above the ground cannot operate successfully with the timing techniques previously used. Since only the total time between transmission and the reception of the echo is measured, there is an uncertainty in the actual position of the target (intruder). The same elapsed time would be measured for a high close-in target as for a more distant low altitude target. The geometry of a representative system illustrating how such an ambiguity occurs is shown in FIG. 1 wherein detection of intruders at altitudes of up to 5000 feet (typical) is accomplished through a 5000 foot sensor 12. Region 10 of FIG. 1 shows the range of possible target locations which could be associated with the same range bin.

Figure 2:
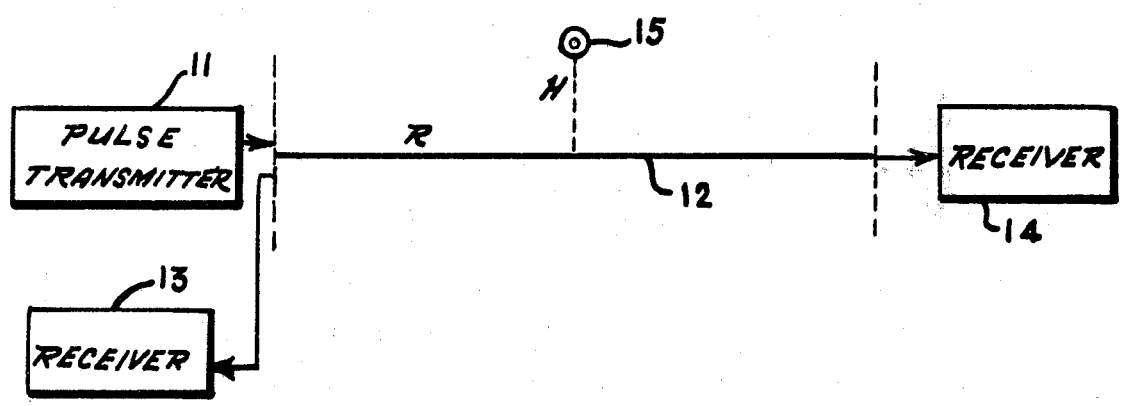
FIG. 2 is a block diagram of the basic elements of instrumentation required to obtain unambiguous range and altitude measurements in accordance with the principles of the invention.

This uncertainty in target position can be eliminated by the system shown in FIG. 2. The transmitter 11 and receiver 13 form a conventional monostatic radar as described above. The transmitter 11 and receiver 14 form a bistatic radar Monostatic and bistatic radars are described in detail in the text *Introduction To Radar Systems*, by Merrill L. Skolnik, McGraw-Hill, 1962 pp 585-594. The two radars in combination and using sensor 12 as a common transmitting and receiving antenna allow both the range R and the altitude H of the target 15 to be determined as follows:

The monstatic radar provides a measurement of the time $t_R$ given by $$t_R = 2(R/v + H/c) \tag{2}$$

where v and c are the propagation velocities along the sensor and in free space respectively. The bistatic measurement gives $t_H$ which is $$t_H = R/v + 2H/c + L - R/v - L/v = 2H/c \tag{3}$$

where L is the total length of the sensor. From Eqs. 1 and 2

$$H = c t_H / 2 \tag{4}$$

and $$R = v/2 (t_R - t_H) \tag{5}$$

the required altitude and range of the target.

In a practical system employing a remotely located bistatic radar receiver a method must be established to bring the information acquired with the bistatic measurement back to the input for processing. This can be accomplished in at least three ways:

(a) Video on look-up sensor: With this method the video output of receiver 14 would be coupled onto the sensor 12 and transmitted back to its input. There it would be extracted by low pass filtering to be used by the system processor.

(b) Coax cable link: The same arrangement as in (a) above except that a separate coax cable would be used to interconnect the input and output instrumentation. This technique has the advantage of allowing a reference (transmit) signal to be sent to receiver 14 thereby allowing coherent operation. The power could also be routed on this cable as well as the video output.

(c) Two-transmitter technique: In this method, a second transmitter is connected to the output of receiver 14. After reception of the main bang pulse from Transmitter 11, the second transmitter transmits a second pulse. Now the second transmitter and receiver 13 form the bistatic pair. Receiver 14 can have a low sensitivity and be unsophisticated since its only function would be to receive the relatively high level pulse from transmitter 11 and subsequently trigger the second transmitter. An appropriate delay between reception of the pulse and generation of the trigger for the second transmitter would have to be provided so that the monostatic and bistatic measurements do not overlap.

Figure 3:
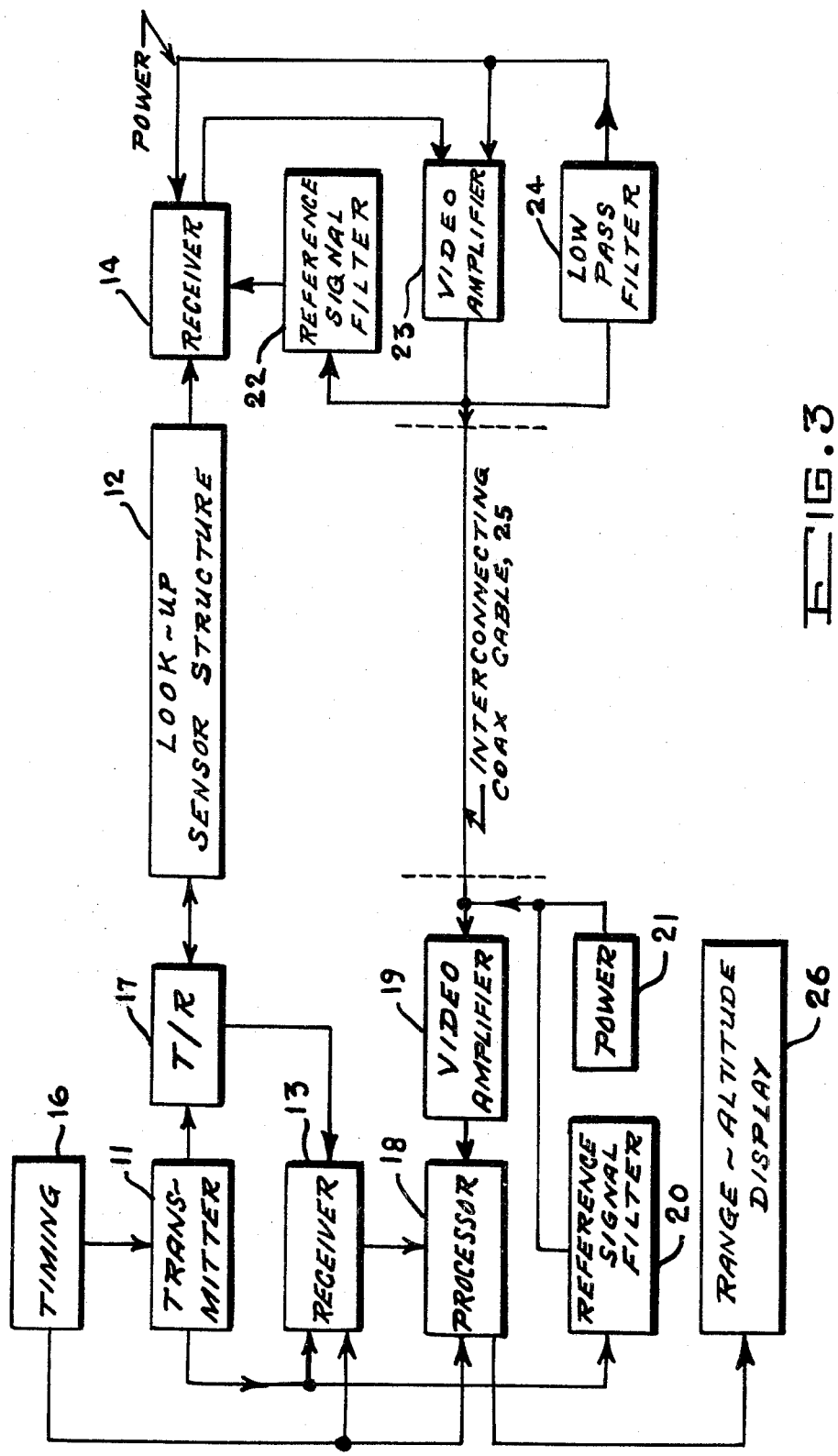
FIG. 3 is a block diagram of one presently preferred embodiment of the invention.

A block diagram of a practical system is shown in FIG. 3. In addition to the transmitter, receivers and sensor described above it includes timing circuit 16, duplexer means 17, processor 18, reference signal filter 20, 22, video amplifiers 19, 23, low pass filter 24, interconnecting coaxial cable 25, power supply 21 and range-altitude display 26 arranged as shown. The complete system uses interconnecting coaxial cable 25 to supply power to receiver 13 and its associated components, supply a reference signal to receiver 14 for coherent operation, and to return the output video from receiver 14 for processing. Appropriate filters are provided for combining and separating the signals for these three functions. The processor 18 implements Equations 4 and 5 and produces outputs to drive the Range/Altitude display 26.

Figure 4:
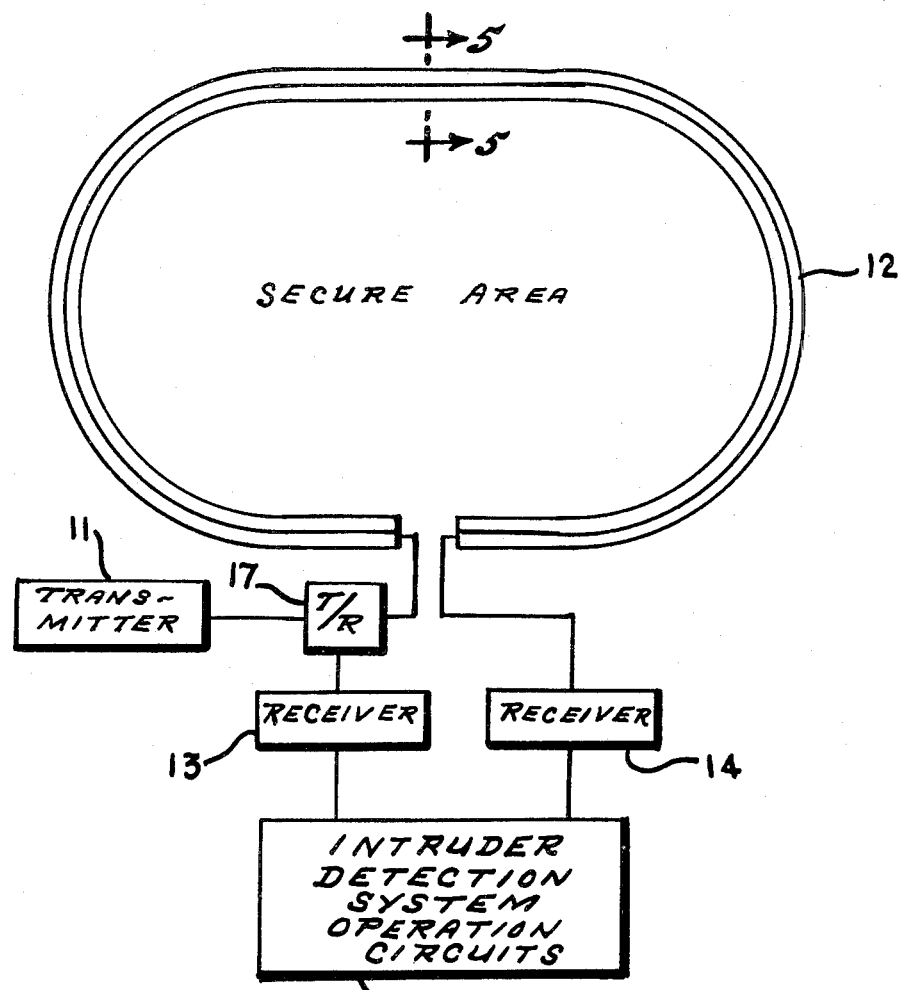
FIG. 4 illustrates a closed perimeter intruder detection system that encorporates the invention.
Figure 5:
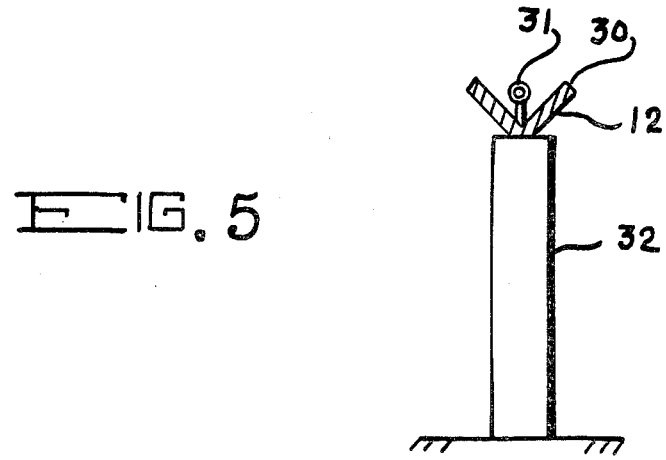
FIG. 5 is an enlarged section of a portion of the system of FIG. 4 taken at 5—5.

FIGS. 4 and 5 illustrate a closed perimeter system. In this system receivers 13 and 14 are physically located in the same facility with the transmitter 11 and system operating circuit 33 and therefore require neither an interconnecting coaxial cable or a second transmitter. The system operating circuit 33 includes the processor 18 and the range-altitude display 26 as well as other conventional functions required to implement the system. FIG. 5 illustrates a sectional view of the look-up sensor structure 12 which can consist of a leaky coaxial cable 31 that is coextensive with and positioned within corner reflector antenna element 30. The corner reflector antenna element is commonly mounted with its aperture facing upwards on a physical deterrent barrier such as wall 32. In practice a typical look-up sensor structure can consist of a leaky coaxial cable with slots spaced at one half wavelength intervals that excite proximity coupled dipoles. The dipoles are mounted over a ground plane to restrict the radiated fields toward the upward direction.

With the invention has been described in terms of its preferred embodiments it is understood that the words which have been used are words of description rather than words of limitation and that changes within the purview of the appended claims may be made without departing from the scope and spirit of the invention in its broader aspects.

What is claimed is:

1. In a radar ranging type intruder detection system utilizing a guided wave perimeter sensor means and having system function circuits that receive and process reflected r.f. signals resulting from intruder violations of said sensor means and develop warning and display signals therefrom the improvement residing in look-up sensor instrumentation for measuring range and altitude of intrusion events, said look-up sensor instrumentation comprising a look-up sensor enclosing an area to be protected comprised of a guided wave structure radiating r.f. energy in an upward direction along its length, monostatic radar means transmitting and receiving r.f. energy through said look-up sensor, bistatic radar means transmitting and receiving r.f. energy through said look-up sensor, and a radar signal processor generating from monostatic and bistatic radar received r.f. signals range and altitude data for utilization by said system function circuits.

2. In a radar ranging type intruder detection system, look-up sensor instrumentation as defined in claim 1 including intrusion event range and altitude display means responsive to the output of said radar signal processor.

3. An intruder detection system comprising a look-up sensor encompassing an area to be protected comprised of a leaky transmission line for radiating r.f. energy in an upwards direction along its length, a transmitter for transmitting r.f. energy first and second r.f. receivers, said transmitter and said first r.f. receiver being connected to one end of said look-up sensor and said second r.f. receiver being connected to the other end, said transmitter and said first r.f. receiver constituting a monostatic radar and said transmitter and said second r.f. receiver constituting a bistatic radar, said look-up sensor constituting transmitting and receiving antenna means for both monostatic and bistatic radars, and processor means receiving the received signals from said first and second r.f. receivers and generating intrusion incident range and altitude data therefrom.

4. An intruder detection system as defined in claim 3 including range and altitude display means receiving an input from said processor means and being responsive to said intrusion incident range and altitude data.

5. An intruder detecting system as defined in claim 4 including duplexer means connected between said transmitter, said first r.f. receiver and said look-up sensor.

* * * * *